United States Patent
Su et al.

(10) Patent No.: US 12,422,912 B2
(45) Date of Patent: Sep. 23, 2025

(54) ELECTRONIC SYSTEM AND PROTECTION METHOD FOR POWER MANAGEMENT CIRCUIT

(71) Applicant: MEDIATEK INC., Hsinchu (TW)

(72) Inventors: Kuan-Wen Su, Hsinchu (TW); Shu-Ching Lin, Hsinchu (TW); Chien-Yu Lan, Hsinchu (TW); Shang-Wei Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 230 days.

(21) Appl. No.: 18/446,619

(22) Filed: Aug. 9, 2023

(65) Prior Publication Data

US 2025/0053220 A1 Feb. 13, 2025

(51) Int. Cl.
| | | |
|---|---|---|
| *G06F 1/3206* | (2019.01) | |
| *G06F 1/26* | (2006.01) | |
| *G06F 1/28* | (2006.01) | |
| *G06F 9/30* | (2018.01) | |
| *G06F 11/00* | (2006.01) | |
| *G06F 21/81* | (2013.01) | |

(52) U.S. Cl.
CPC ............. *G06F 1/3206* (2013.01); *G06F 1/26* (2013.01); *G06F 1/28* (2013.01); *G06F 9/30101* (2013.01); *G06F 11/00* (2013.01); *G06F 21/81* (2013.01)

(58) Field of Classification Search
CPC . G06F 1/26; G06F 1/28; G06F 1/3206; G06F 11/00; G06F 21/81; G06F 9/30101
See application file for complete search history.

(56) References Cited

U.S. PATENT DOCUMENTS

| | | | |
|---|---|---|---|
| 8,751,817 B2* | 6/2014 | Kato | G06F 21/575 713/187 |
| 11,768,968 B2* | 9/2023 | Van Nieuwenhuyze | G06F 21/575 726/26 |
| 2003/0120922 A1* | 6/2003 | Sun | G06F 21/81 713/168 |

\* cited by examiner

*Primary Examiner* — Terrell S Johnson
(74) *Attorney, Agent, or Firm* — McClure, Qualey & Rodack, LLP

(57) ABSTRACT

An electronic system is provided. The electronic system includes a processor and a first power management circuit. The processor generates and outputs a first data frame. The first data frame includes at least one first guard bit and a first address. The first power management circuit includes a first register. The first power management circuit receives the first data frame and determines legitimacy of the first address according to the least one first guard bit. In response to that the first address is legal, the power management circuit transmits a first response to the processor and accesses a first region in the first register according to the first address.

20 Claims, 5 Drawing Sheets

ELECTRONIC SYSTEM AND PROTECTION METHOD FOR POWER MANAGEMENT CIRCUIT

BACKGROUND OF THE INVENTION

Field of the Invention

The invention relates to an electronic system, and more particularly to an electronic system with power management integrated circuit (PMIC) protection.

Description of the Related Art

Generally, an electronic device communicates with a power management integrated circuit (PMIC) for managing power used by devices or applications in the electronic device. When a processor of the electronic device attempts to access a register in the PMIC for reading power information or controlling power conversion, the processor has to generate an address for the register according to one of pre-built header files. Moreover, PMICs with different generations have been developed. However, the address range of a register in a PMIC with a specific generation can overlap the address range of a register in another PMIC with another specific generation. If the processor generates an address for accessing the register according to a wrong header file, the register is read or written incorrectly, which results in abnormal operation of the electronic device or incorrectly writing on the register.

BRIEF SUMMARY OF THE INVENTION

An exemplary embodiment provides an electronic system. The electronic system comprises a processor and a first power management circuit. The processor generates and outputs a first data frame. The first data frame comprises at least one first guard bit and a first address. The first power management circuit comprises a first register. The first power management circuit receives the first data frame and determines legitimacy of the first address according to the least one first guard bit. In response to that the first address is legal, the power management circuit transmits a first response to the processor and accesses a first region in the first register according to the first address.

In some embodiments, the first data frame comprises a first address section and a first data section, and the at least one first guard bit is in the first address section. The at least one first guard bit is the least one most significant bit (MSB) in the first address section.

In some embodiments, the first data frame comprises a first address section and a first data section, and the at least one first guard bit is in the first data section.

In some embodiments, in response to that the first address is illegal, the power management circuit transmits a second response to the processor.

Another exemplary embodiment provides a protection method for a first power management circuit. The protection method comprises the steps: by a processor, generating a first data frame, wherein the first data frame comprises at least one first guard bit and a first address; transmitting the first data frame from the processor to the first power management circuit comprising a first register; by the first power management, determining legitimacy of the first address according to the least one first guard bit; and by the power management circuit, transmitting a first response (ACK) to the processor and accessing a first region in the first register according to the first address in response to that the first address is legal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
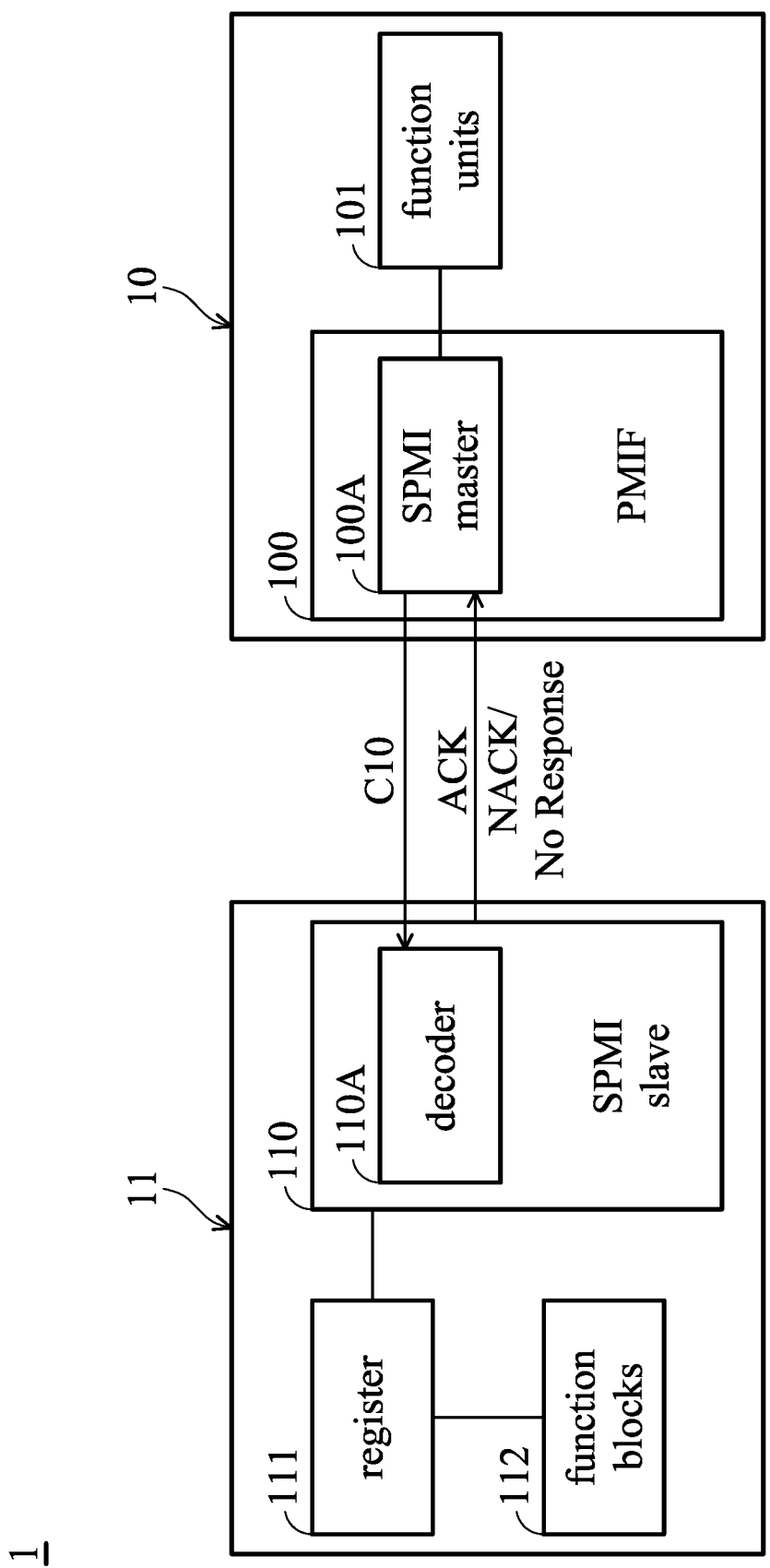
FIG. 1 shows an exemplary embodiment of an electronic system.

FIG. 1 shows an exemplary embodiment of an electronic system. As shown in FIG. 1, an electronic system 1 comprises a processor 10 and a power management circuit 11. In the embodiment, the power management circuit is implemented by a power management integrated circuit (PMIC), and the communication between the processor and the power management circuit 11 is performed based on a system power management interface (SPMI) protocol.

The processor 10 comprises a power management interface (PMIF) 100 and function units 101. In an embodiment, the function units 101 comprise at least one of a central processing unit (CPU), a graphics processing unit (GPU), a display panel, a backlight module, an audio player, analog-to-digital converters, and any units or device related to the PMIC. The function units communicate with the power management circuit 11 through the PMIF 100. Based on the SPMI protocol, the PMIF 100 comprises an SPMI master 100A, and the power management circuit 11 comprises an SPMI slave 110 corresponding to the SPMI master 100A. As shown in FIG. 1, the power management circuit 11 further comprises a register 111 and function blocks 112. In an embodiment, the function blocks 112 perform at least one of DC-to-DC conversion, battery charging, power-source selection, voltage scaling, and a function related to power requirements.

When the processor 10 attempts to access the register 111 of the power management circuit 11 (that is, when the processor 10 attempts to perform a read or write operation on the register 111), the processor 10 transmits a command C10 to the power management circuit 11 through the SPMI master 100A.

Figure 2:
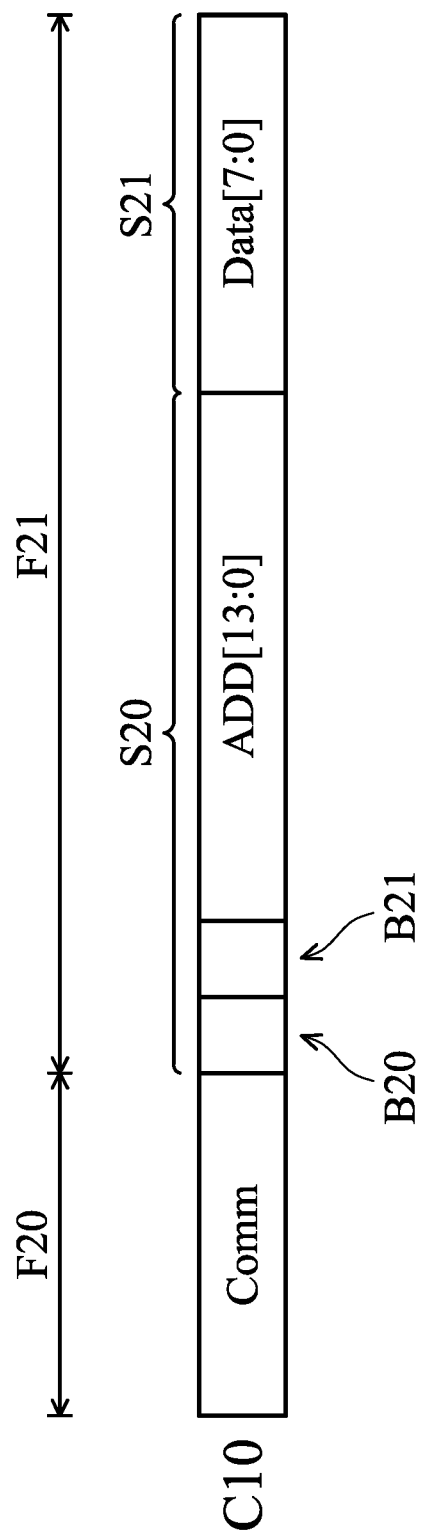
FIG. 2 is a schematic diagram showing an exemplary embodiment of a command transmitted to a power management circuit from a processor.

As shown in FIG. 2, the command C10 comprises a command frame F20 and a data frame F21. The command frame F20 indicates the operation (read or write operation) that the processor 10 attempts to perform on the register 111. The data frame F21 comprises an address section S20 and a data section S21. For example, the address section S20 consists of 16 bits, and the data section S21 consists of 8 bits Data[7:0]. In the embodiment of FIG. 2, the 16 bits in the address section S20 comprises at least one guard bit. For example, the 16 bits in the address section S20 comprises two guard bits B20 and B21 that are the two most significant bits (MSBs) in the address section S20 and 14 bits ADD [13:0]. The 14 bits ADD[13:0] in the address section S20 indicates an address in the register 111.

Figure 3:
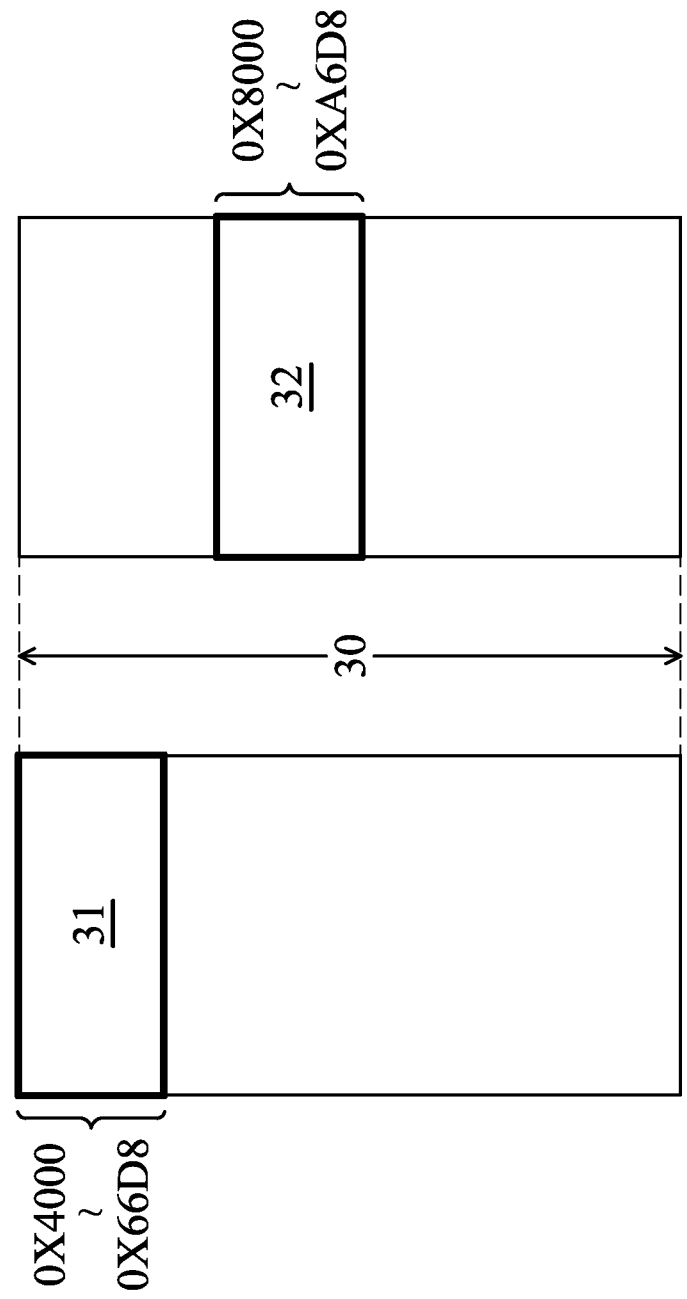
FIG. 3 is a schematic diagram showing an exemplary embodiment of address ranges of registers in different generations.

Referring to FIG. 3, an address range 30 is defined by the address section S20 with 16 bits. According to an embodiment, in cases where the power management circuit 11 is implemented by a PMIC of a specific generation, the address range 31 of the register 111 is from 0X4000-0X66D8, wherein the values of the two MSBs in the address section S20 are "0" and "1"; in cases where the power management circuit 11 is implemented by a PMIC of another specific generation, the address range 32 of the register 111 is from 0X8000-0XA6D8, wherein the values of the two MSBs o in the address section S20 are "1" and "0". The address range 31 does not overlap the address range 32. In other words, the address ranges for different PMIC generations are independent of each other. As described above, the bits B20 and B21 in the address section S20 serve as the guard bits. Since the values of the two MSBs in the address section S20 for a specific PMIC generation are different from the values of the two MSBs in the address section S20 for another specific PMIC generation, the values of the two MSBs in the address section S20 serve as guard bits B20 and B21 for identifying the PMIC generation of the power management circuit 11.

According to the embodiment, the processor 10 builds various header files for different PMIC generations. Each header file records an address range of a register, an address of each block in the register, and the guard bit(s) corresponding to the register, wherein one block corresponding a power management function. For example, when the power management circuit 11 is implemented by a PMIC of a specific generation, the processor 10 generates the command frame F20 and the data section S21 of the data frame F21 according to the operation (read or write operation) that the processor 10 attempts to perform on the register 111, and further generates the guard bits B20 and B21 and the 14 bits ADD[13:0] in the address section S20 according to the header file corresponding to the specific PMIC generation, thereby generating the command C10.

Referring to FIG. 1, the processor 10 outputs the command C10 to the SPMI slave 110 through the SPMI master 100A. The decoder 110A receives the command C10 and determines legitimacy of the address defined by the 14 bits ADD[13:0] in the address section S20 according to the guard bits B20 and B21 in the address section S20. When the decoder 110A determines that the address defined by the 14 bits ADD[13:0] is legal, the power management circuit 11 transmits a response ACK to the processor 10 and then accesses a region in the register 111 according to the address defined by the 14 bits ADD[13:0].

When the decoder 110A determines that the address defined by the 14 bits ADD[13:0] is illegal, the power management circuit 11 transmits another response to the processor 10 and does not access the register 111. In cases where the command frame F20 of the command C10 indicates a write operation, when the decoder 110A determines that the address defined by the 14 bits ADD[13:0] is illegal, the power management circuit 11 transmits a response NACK to the processor 10. In cases where the command frame F20 of the command C10 indicates a read operation, when the decoder 110A determines that the address defined by the 14 bits ADD[13:0] is illegal, the power management circuit 11 transmits a No Response frame serving a response to the processor 10.

In the following paragraphs, the operation of determining legitimacy of the address defined by the 14 bits ADD[13:0] will be described.

Figure 4:
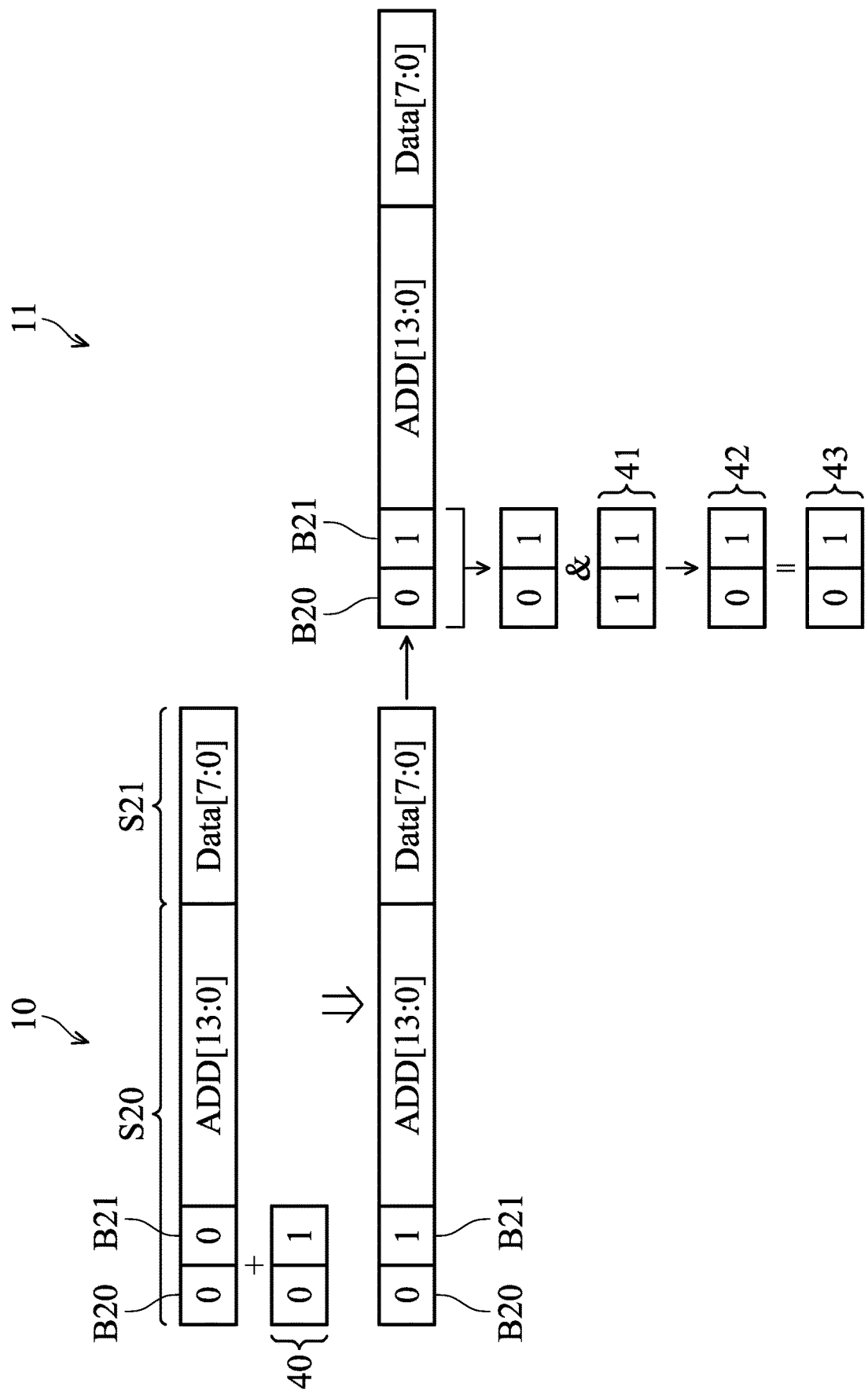
FIG. 4 shows is a schematic diagram showing an exemplary embodiment of an operation of determining legitimacy of an address.

FIG. 4 shows is a schematic diagram showing an exemplary embodiment of then operation of determining legitimacy of the address defined by the 14 bits ADD[13:0]. For clear description, FIG. 4 only shows the address section S20 and the data section S21 of the data frame F21 without the command frame F20. Referring to FIG. 4, when no guard bits are defined, each of the values of the guard bits B20 and B21 are set to "0", and the address defined by the 14 bits ADD[13:0]. In the embodiment, the processor 10 changes the values of the guard bits B20 and B21 to "0" and "1" indicated by the reference label 40 according to the header file corresponding to the PMIC generation of the register 111. Then, the processor 10 transmits the address section S20 and the data section S21 to the o the SPMI slave 110 through the SPMI master 100A. The decoder 110A in the SPMI slave 110 pre-determines two mask bits 41 with values "1" and "1". The decoder 110A performs an AND logic operation on the guard bits B20 and B21 and the mask bits 41. According to the result of the AND logic operation, the decoder 110A generates two result bits 42 with values "0" and "1".

The decoder 110A stores pre-determined guard bits 43 with values "0" and "1" B20 and B21 to "0" and "1". When the values of the result bits 42 are generated, the decoder 110A compares the result bits 42 and the pre-determined guard bits 43. In cases where the values of the result bits 42 are identical to the pre-determined guard bits 43 as shown in FIG. 4, the decoder 110A determines that the 14 bits ADD[13:0] is legal.

When the processor 10 refers to a wrong header file that does not correspond to the PMIC generation of the register 111, the process 110 does not set values of the guard bits B20 and B21 as "0" and "1". In this case, the values of the result bits 42 are not "0" and "1", that is, the values of the result bits 42 are not identical to the pre-determined guard bits 43. Thus, the decoder 110A determines that the 14 bits ADD [13:0] is illegal, the power management circuit 11 transmits a response NACK or a No Response frame to the processor 10, and no read or write operation is performed on the register 111.

According to the above embodiments, the guard bits B20 and B21 are two of the bits in the address section S20. In other embodiments, the guard bits B20 and B21 that are used to identify the PMIC generation of the power management circuit 11 can be two of the bits in the data section S21. For example, the guard bits B20 and B21 are the two MSBs in the data section S21. The operation of determining legitimacy of the address defined by the 14 bits ADD[13:0] according to the guard bits in the data section S21 is similar to the above embodiments where the guard bits are in the address section S20. Thus, the related description is omitted.

In another embodiment, when the processor 10 communicates with another power management circuit having another specific PMIC generation, the processor 10 generates the command frame F20 and the data section S21 of the data frame F21 according to the operation (read or write operation) that the processor 10 attempts to perform on the register 111, and further generates the guard bits B20 and B21 and the 14 bits ADD[13:0] in the address section S20 according to another header file corresponding to the specific PMIC generation. The decoder of this power management circuit stores pre-determined guard bits that are different from the pre-determined guard bits 43 shown in FIG. 4. Through the specific guard bits defined in the corresponding header file and the pre-determined guard bits stored in the power management circuit, the legitimacy of the address from the processor 10 can be determined correctly.

According to the above embodiment, an address range of a register in a power management circuit with a specific PMIC generation does not overlap an address range of a register in another power management circuit with another specific PMIC generation. Moreover, the electronic system 1 defines at least on guard bit through a header file for identifying the PMIC generation of the power management circuit 11. Thus, when the process 10 refers to a wrong header file to generate the command C10, read or write operation on the register 111 is prohibited, which prevents the electronic system 1 from operating abnormally and protects the register 111 from being written wrong.

Figure 5:
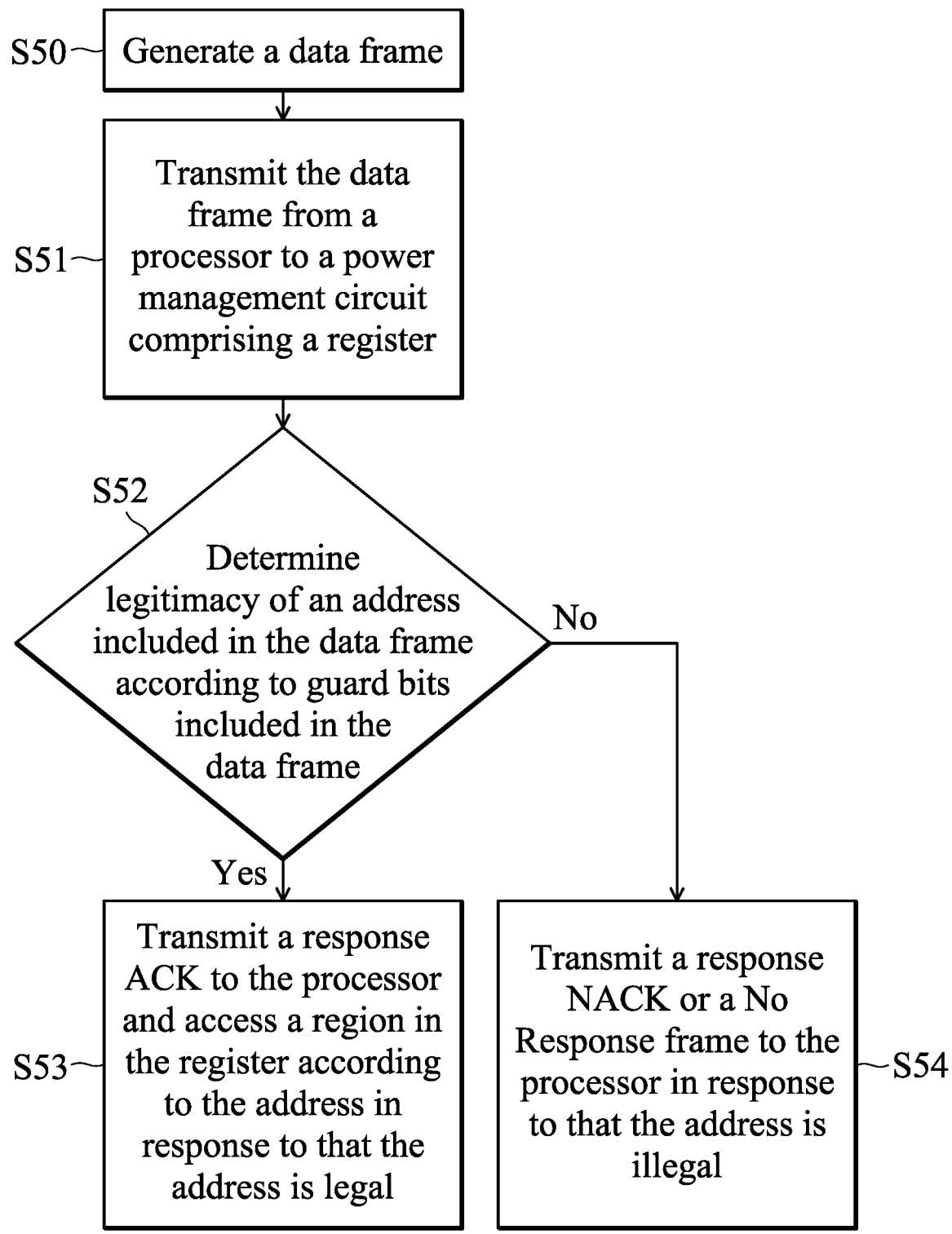
FIG. 5 shows an exemplary embodiment of a protection method for a power management circuit.

FIG. 5 shows an exemplary embodiment of a protection method for the power management circuit 11. Referring to FIGS. 1-2 and FIG. 5, at Step S50, the processor 10 generates the command frame F20 and the data frame F21 of the command C10. In an embodiment, the address section S20 comprises two guard bits B20 and B21 that are defined according to a corresponding header file. Then, at Step S51, the processor 10 transmits the command C10 including the command frame F20 and the data frame F21 to the power management circuit 11. The protection method proceeds to Step S52, the decoder 110A determines legitimacy of the address defined by the 14 bits ADD[13:0] in the address section S20 according to the guard bits B20 and B21 included in the address section S20. When the decoder 110A determines that the address is legal (Step S52—Yes), the power management circuit 11 transmits a response ACK to the processor 10 and then accesses a region in the register 111 according to the address defined by the 14 bits ADD [13:0] (Step S53). When the decoder 110A determines that the address defined by the 14 bits ADD[13:0] is illegal (Step S52—No), the power management circuit 11 transmits a response NACK or a No Response frame to the processor 10, and no read or write operation is performed on the register 111 (Step S54).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic system comprising:
a processor generating and outputting a first data frame, wherein the first data frame comprises at least one first guard bit and a first address; and
a first power management circuit comprising a first register, receiving the first data frame, and determining legitimacy of the first address according to the least one first guard bit,
wherein in response to that the first address is legal, the power management circuit transmits a first response to the processor and accesses a first region in the first register according to the first address.

2. The electronic system as claimed in claim 1, wherein the first data frame comprises a first address section and a first data section, and the at least one first guard bit is in the first address section.

3. The electronic system as claimed in claim 2, wherein the at least one first guard bit is the least one most significant bit (MSB) in the first address section.

4. The electronic system as claimed in claim 1, wherein the first data frame comprises a first address section and a first data section, and the at least one first guard bit is in the first data section.

5. The electronic system as claimed in claim 4 wherein the at least one first guard bit is the least one most significant bit (MSB) in the first data section.

6. The electronic system as claimed in claim 1, wherein in response to that the first address is illegal, the power management circuit transmits a second response (NACK/No response) to the processor.

7. The electronic system as claimed in claim 1, wherein the first power management circuit further comprises:
a decoder receiving the first data frame and comparing the least one first guard bit with at least one first predetermined guard bit to generate a first comparison result indicating the legitimacy of the first address,
wherein in response to that the least one first guard bit is equal to the least one first predetermined guard bit, the first comparison result indicates that first address is legal.

8. The electronic system as claimed in claim 1, wherein the processor further generates and outputs a second data frame comprising at least one second guard bit and a second address, and the electronic system further comprises:
a second power management circuit comprising a second register, receiving the second data frame, and determining legitimacy of the second address according to the least one second guard bit,
wherein in response to that the second address is legal, the power management circuit transmits a second response to the processor and accesses a second region in the second register according to the second address.

9. The electronic system as claimed in claim 8, wherein an address range of the first register is different from an address range of the second register.

10. The electronic system as claimed in claim 1, wherein the first power management circuit is a power management integrated circuit (PMIC), and communication between the processor and the first power management circuit is based on a system power management interface (SPMI) protocol.

11. A protection method for a first power management circuit, comprising:
by a processor, generating a first data frame, wherein the first data frame comprises at least one first guard bit and a first address;
transmitting the first data frame from the processor to the first power management circuit comprising a first register;
by the first power management, determining legitimacy of the first address according to the least one first guard bit; and
by the power management circuit, transmitting a first response to the processor and accessing a first region in the first register according to the first address in response to that the first address is legal.

12. The protection method as claimed in claim 11, wherein the first data frame comprises a first address section and a first data section, and the at least one first guard bit is in the first address section.

13. The protection method as claimed in claim 12, wherein the at least one first guard bit is the least one most significant bit (MSB) in the first address section.

14. The protection method as claimed in claim 11, wherein the first data frame comprises a first address section and a first data section, and the at least one first guard bit is in the first data section.

15. The protection method as claimed in claim 14 wherein the at least one first guard bit is the least one most significant bit (MSB) in the first data section.

16. The protection method as claimed in claim 11, further comprising:
by the power management circuit, transmitting a second response to the processor in response to that the first address is illegal.

17. The protection method as claimed in claim 11, wherein determining legitimacy of the first address according to the least one first guard bit comprises:
comparing the least one first guard bit with at least one first predetermined guard bit to generate a first comparison result indicating the legitimacy of the first address,
wherein in response to that the least one first guard bit is equal to the least one first predetermined guard bit, the first comparison result indicates that first address is legal.

18. The protection method as claimed in claim 11, further comprising:
by the processor, generating a second data frame, wherein the second data frame comprises at least one second guard bit and a second address;
transmitting the second data frame from the processor to a second power management circuit comprising a second register;
by the second power management circuit, determining legitimacy of the second address according to the least one second guard bit; and
by the power management circuit, transmitting a second response to the processor and accessing a second region in the second register according to the second address in response to that the second address is legal.

19. The protection method as claimed in claim 18, wherein an address range of the first register is different from an address range of the second register.

20. The protection method as claimed in claim 11, wherein the first power management circuit is a power management integrated circuit (PMIC), and communication between the processor and the first power management circuit is based on a system power management interface (SPMI) protocol.

* * * * *